Feb. 25, 1964  J. M. WUERTH ETAL  3,122,022
ACCELEROMETER AND INTEGRATOR
Filed Sept. 23, 1955  4 Sheets-Sheet 1

INVENTORS.
JOHN M. WUERTH
BY DOYLE E. WILCOX
CHARLES K. WEST
MURYL HALLMAN
BRUCE A. SAWYER
*William R. Lane*
ATTORNEY INVENTORS.
JOHN M. WUERTH
DOYLE E. WILCOX
BY CHARLES K. WEST
MURYL HALLMAN
BRUCE A. SAWYER
William R. Lane
ATTORNEY Feb. 25, 1964   J. M. WUERTH ETAL   3,122,022
ACCELEROMETER AND INTEGRATOR
Filed Sept. 23, 1955   4 Sheets-Sheet 4

INVENTORS.
JOHN M. WUERTH
DOYLE E. WILCOX
BY CHARLES K. WEST
MURYL HALLMAN
BRUCE A. SAWYER
William ATTORNEY

United States Patent Office 3,122,022
Patented Feb. 25, 1964

3,122,022
ACCELEROMETER AND INTEGRATOR
John M. Wuerth, Garden Grove, Doyle E. Wilcox, Puente, Charles K. West, Long Beach, Muryl Hallman, Whittier, and Bruce A. Sawyer, Van Nuys, Calif., assignors to North American Aviation, Inc.
Filed Sept. 23, 1955, Ser. No. 536,686
14 Claims. (Cl. 73—490)

This invention pertains to a device for indicating velocity or distance traveled. It is a mass, responsive to accelerations combined with electromechanical rotating means for integrating the accelerations. More specifically, it may be described as an integrating motor which is, in one embodiment, sensitive to acceleration.

This invention relates to an application filed in the name of John M. Wuerth on November 1, 1948, Patent No. 2,882,034, entitled "Accelerometer and Integrator" and is an improvement of the device shown therein. This invention also relates to Patent No. 2,700,127, to Bruce A. Sawyer, for a "Torque Generating System," issued January 18, 1955.

If the instantaneous accelerations experienced by a vehicle starting from rest and moving along any course in inertial space are known, the velocity at any point along the course can be determined by the first integral of the accelerations. And, if the velocities of the vehicle are known over a given period of time, the distance traveled during that time can be determined from the first integral of velocities. Thus, the position of the vehicle at any time after leaving a starting point can be computed if all accelerations are measured and the starting position is known. Devices which indicate distance traveled merely by the measurement of accelerations as explained, are advantageous over other types of distance measuring or navigating systems because of the fact that no outside information is required, nor is operation affected by wind, weather or other external conditions. Inertia alone is relied upon.

It is therefore an object of this invention to provide an improved distance meter.

It is another object of this invention to provide an improved integrating motor.

It is a further object of this invention to provide an accurate acceleration sensitive device which indicates velocity and distance traveled.

It is a further object of this invention to provide a device which performs the integration of acceleration.

It is still another object of this invention to provide an integrating motor which is sensitive to accelerations.

Other objects of invention will become apparent from the following description taken in connection with the accompanying drawings, in which FIG. 1 is a rudimentary sketch of the device of the invention;

Figure 1:
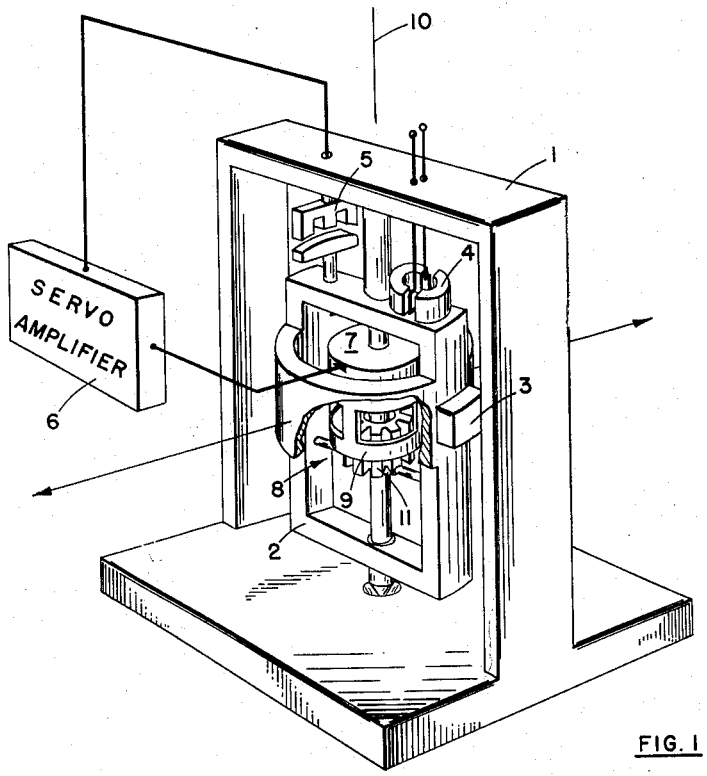

Referring to FIG. 1, the device is supported in a frame, a case, or housing 1. A pendulous element 2, by a low-coercion bearing is pivotally mounted in respect to frame 1. A deflection of pendulous element 2 during acceleration is caused by reason of unbalancing mass 3. It is to be realized that unbalancing mass 3 is representative only and that to accomplish the same effect, pendulous element 2 may be substantially symmetrical with its center of gravity slightly removed from its axis of rotation 10. Deflection of pendulous element 2 with respect to housing 1 may also be obtained by torquer 4 in accordance with electrical input signals. Deflections of pendulous element 2 with respect to frame 1 are detected by pickoff 5 and amplified in a servo amplifier 6, whose output is utilized to drive the rotor 7 of an electric motor in a particular direction and at an angular acceleration so that the rotor reaction on its stator, pendulous element 2, will cause pendulous element 2 to return to an undeflected position. Considering pendulous element 2 to be the stator of a motor and rotor 7 to be the rotor, it can be seen that any motor torque causing angular acceleration of rotor 7 causes an equal and opposite torque upon the stator 2. By servo amplifier 6, rotor 7 is thus rotated at a speed to maintain stator 2 in an undeflected position. Upon any acceleration of the complete accelerometer in the sensitive directions indicated by the arrows, the pendulous element 2 will deflect and cause the rotation of rotor 7 at a speed and in a direction to indicate the integration of all such accelerations. Rotor 7 is mounted in pendulous element 2 by low-friction bearings and has very little loss. Once the rotor 7 is brought to a given speed by an acceleration, it is controlled substantially at that speed through the action of pickoff 5 and amplifier 6 until another acceleration or deceleration occurs. Therefore, when the instrument is shielded from the influence of gravity (by, for example, maintaining the instrument in a horizontal plane), the speed of rotation of rotor 7 indicates the speed at which the device is traveling in the direction of the sensing axis, and the number of rotations indicates the distance traveled.

Figure 2:
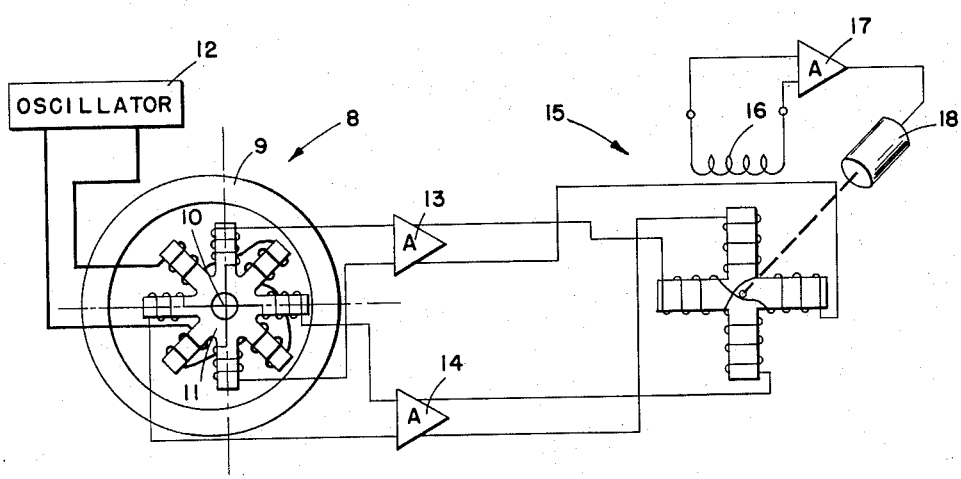
FIG. 2 is a schematic diagram of the resolver which indicates rotor position.

In order to count the number of rotations and determine the speed at which rotor 7 is rotating, generating means such as a resolver 8 is mounted on the shaft of rotor 7 and provides an electrical output indicating the rotations of rotor 7. Resolver 8 is comprised of the elements shown in FIG. 2. A soft iron eccentric ring 9 is connected to rotate with rotor 7 about axis 10. For clarity refer to FIG. 1. Magnetic core 11 of laminated soft magnetic iron has 8 salient poles and is connected rigidly to pendulous element 2 of FIG. 1. Oscillator 12 excites every other pole of core 11. The eccentricity of soft iron ring 9 acts to couple these poles to the alternate poles and provide an output through amplifiers 13 or 14 to a follow-up resolver 15 which is servo-controlled. Secondary winding 16 of resolver 15 drives control amplifier 17 and servo motor 18 and by servo loop control insures that resolver 15 rotates exactly with soft iron ring 9. Resolver 15, located remotely, follows rotor 7, and indicates by its speed of rotation the velocity indicated by the distance meter and by its number of rotations, the distance that has been traveled.

Figure 3:
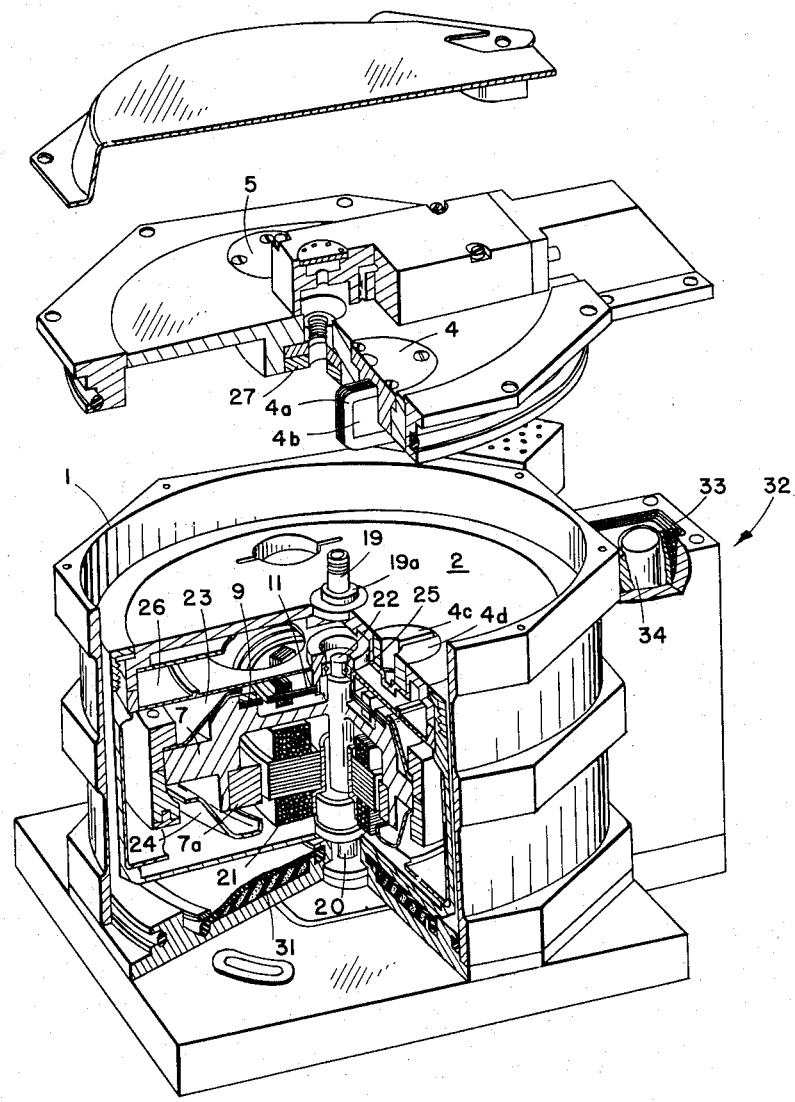
FIG. 3 is a cutaway section of the distance meter.

FIG. 3 is a partial section and partially exploded view which illustrates practical construction of the device of FIG. 1 which shows a case 1 with the top removed. Pendulous element 2 is disposed within the case 1 and is adapted for rotation with respect thereto through a journal type bearing having a minimum of friction. Stub shaft 19, which provides the journal, includes collar 19a which provides an axial thrust pad, is connected to pendulous element 2 and extends into the top of case 1 where it is floated in block 27 by fluid pressure. The other end of pendulous element 2 is similarly journalled through a stub shaft 20 to frame 1. The motor in the device of FIG. 3 is a wound stator. The stator 21 is a laminated spider and is connected rigidly to and is a part of pendulous element 2 as explained in reference to FIG. 1. The rotor 7 is rigidly mounted to a central shaft 22 which is bearing-mounted within and accurately coaxial with pendulous element 2. Rotor 7 is, in this instance, magnesium and includes a permanent magnet ring 7a of two poles which cooperates with the wound stator to provide a motor. Laminated soft iron ring 9 and magnetic core 11 are illustrated in their structural relationships in FIG. 3. Ring 9 is connected to rotate with rotor 7, and core 11 is connected to pendulous element 2. Electrical leads to the windings on the poles of core 11 and wound stator 21 may be brought out through the center of shaft 19. These leads must be designed to exert a minimum of physical coercion on the pendulous element 2. Magnetic shields 23 and 24 are for the purpose of confining electromagnetic leakage to the central part of the motor and reducing the drag on pendulous element 2 by case 1 because of electromagnetic fields induced in pendulous element 2. Case 1 is shielded with mu-metal to protect from external magnetic fields. Bearing 25 mounting central rotor shaft 22 are preloaded with respect to pendulous element 2 by flexible web, or diaphragm 26.

Figure 4:
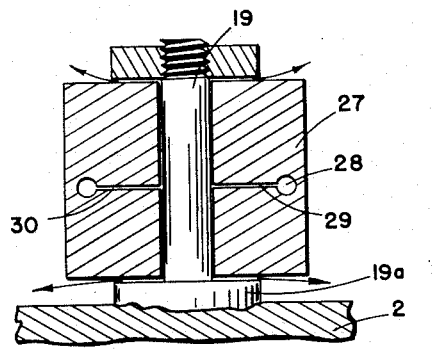
FIG. 4 is a schematic of a fluid bearing.

FIG. 4 indicates journal shaft 19 within block 27 and illustrates the channel flow of fluid at high pressure from a manifold 28 through annular channels 29 and 30 into the journal area thereby floating journal 19 in block 27 without metallic contact. These channels and clearances are enlarged for clarity. In actual construction, their widths is on the order of 0.001 of an inch. The fluid may be air, providing a floating type air bearing, but is preferably a liquid, which liquid fills the space surrounding pendulous element 2 and provides a flotation medium therefor. In the case of a liquid, the virtual density of pendulous element 2 is matched by the density of the flotation fluid, and thus reduces the loads placed on the bearing consisting of journal 19 and block 27. Halogenated hydrocarbons such as one named "Fluorolube" have been found satisfactory for this purpose. Essentially, the fluid should be of desired density, low viscosity, a minimum of corrosiveness, low thermal coefficient of expansion and a minimum of electrolytic action. In FIG. 3, the fluid entirely immerses the sealed pendulous element 2. A suitable diaphragm 31, backed by a sponge rubber pad or ring, or a bellows-type construction, provides a pressure of approximately one atmosphere, and provides an expansible fluid chamber to accommodate the fluid as it expands with an increase in temperature. The pressure of the fluid is thus regulated.

Pump 32 having two electrical solenoids such as solenoid 33, actuates magnetic plunger 34 to provide flotation fluid under about 40 p.s.i. pressure to manifold 28, FIG. 4, and the corresponding manifold of the block surrounding journal 20. An air-filled rubber ball or bellows accumulator in the reservoir of pump 32 will serve to smooth out the fluctuations in pressure and add to the regulation of the pressure of the fluid.

FIG. 3 further illustrates a method of "bias" or artificially deflecting pendulous element 2 by a torquer 4. A coil 4a is wound on a nonmetallic core 4b and affixed to the cover of case 1. This coil lies between magnetic poles 4c and 4d of pendulous element 2 when the case is closed. Current can then be fed to coil 4a from an external source, to artificially deflect pendulous element 2 to "zero" it or to compensate for components of gravity which may be affecting the device.

Figure 5:
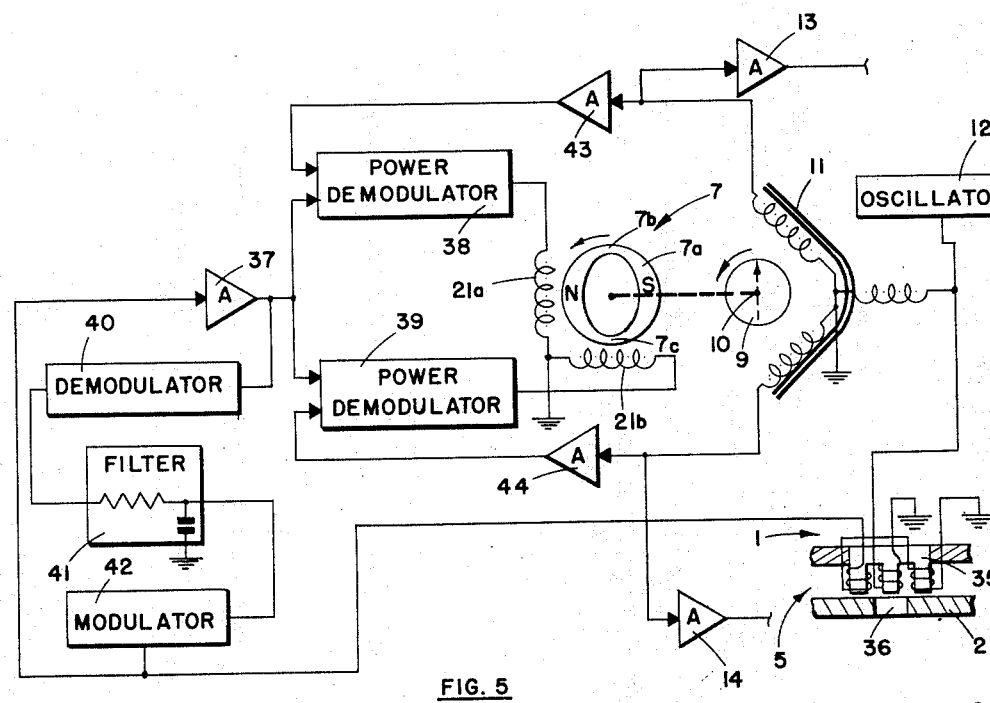
FIG. 5 is an electrical schematic of the device of the invention.
Figure 6:
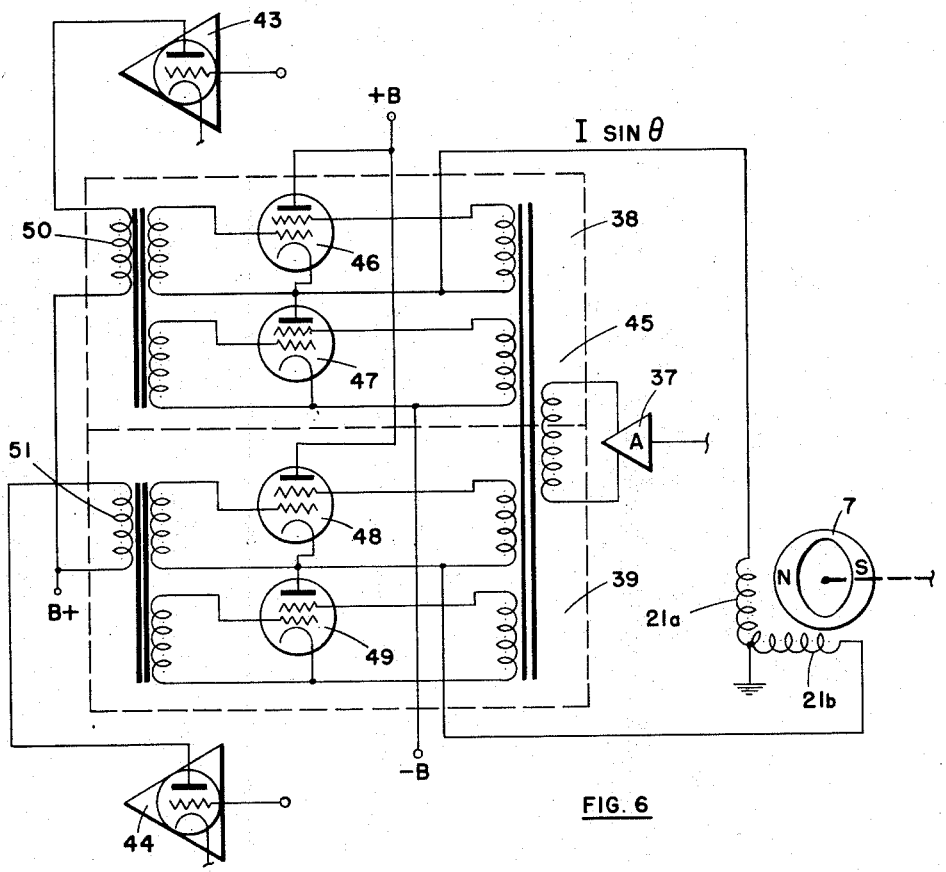
FIG. 6 is a schematic of the two demodulators.

In FIGS. 1 and 3 is illustrated pickoff 5 which senses any deflection, or rotation, of pendulous element 2 with respect to case 1. FIG. 5 further illustrates this pickoff as reluctance E-type, but it may be of other types, such as capacitive. A ferromagnetic E-core 35 has a center pole whose winding is excited by oscillator 12. The outer poles have windings connected in series opposition. The ferromagnetic element 36 by its position couples the magnetic field of the center pole to one outer pole or the other, more strongly, depending on its exact position. Amplifier 37 and demodulators 38 and 39 form a servo loop which receives the pickoff output signal which by its magnitude indicates the amount of relative rotation between case 1 and pendulous elements 2, and by its phase, the relative direction of displacement. Servo compensation is obtained by demodulator 40, filter or equalizing network 41 and modulator 42 connected in feedback circuit around amplifier 37. Power demodulators 38 and 39 receive the signal and drive two-phase stator windings 21a and 21b, causing rotor 7 to turn at a speed according to the magnitude of the signal and in a direction according to the phase. Rotor 7 is a permanent magnet, and the stator windings 21a and 21b must be excited in correct phase to cause the rotor to rotate. It is desirable that the field produced by the signal from demodulators 38 and 39 in the stator windings 21a and 21b be 90° removed from the magnetic axis of the rotor. This is accomplished in D.-C. motors by a commutator and brushes. In this instance, external commutation is accomplished by feeding back from resolver 9 a reference frequency through amplifiers 43 and 44 to phase sensitive demodulators 38 and 39. The pickoff signal from amplifier 37 is then impressed on a frequency which is always of correct phase to rotate rotor 7. That is, the magnetic field axis of windings 21a and 21b is always 90° from the axis of the rotor poles. In this manner, the motor achieves maximum torque at all speeds. In effect, a self-synchronous servo is achieved, the pickoff signal determining the amplitude of the excitation current in the windings and the resolver furnishing the frequency and phase of these currents. This system is more fully explained in the patent to Sawyer mentioned previously. Further detail of demodulators 38 and 39 is shown in FIG. 6 in which the pickoff signal is received through amplifier 37 and is coupled through transformer 45 to the screen grids of tetrodes 46, 47, 48 and 49. The signals from the resolver are received through amplifiers 43 and 44, and are coupled through transformers 50 and 51 to the control grids of tubes 46 and 47 and tubes 48 and 49, respectively. These demodulators 38 and 39 remove the carrier frequency of the oscillator and modulate the resolver signal amplitude in accordance with the pickoff signal. The output to stator winding 21a is at the common connection of the cathode of tube 46 and the plate of tube 47. The output to stator winding 21b is at the common connection of the cathode of tube 48 and the plate of tube 49.

As the device of the invention experiences acceleration in its sensitive direction, pendulous stator 2 deflects by reason of its eccentric axial mounting. Rotor 7, then, rotates in a direction and at a speed according to the deflection of pendulous stator 2 relative to case 1. It will be recalled that the reaction force between rotating rotor 7 and pendulous stator 2 acts to cause pendulous element 2 to return to an undeflected position. As a practical matter, due to the fast response of the servo loop illustrated in FIG. 5, pendulous element 2 is held virtually undeflected at all times.

Rotor 7 tends to become demagnetized by the ripple currents in windings 21a and 21b. An effective method of preventing such demagnetization is to relieve the opposing sides of the rotor, as at 7b and 7c, making it a salient pole rotor.

Figure 7:
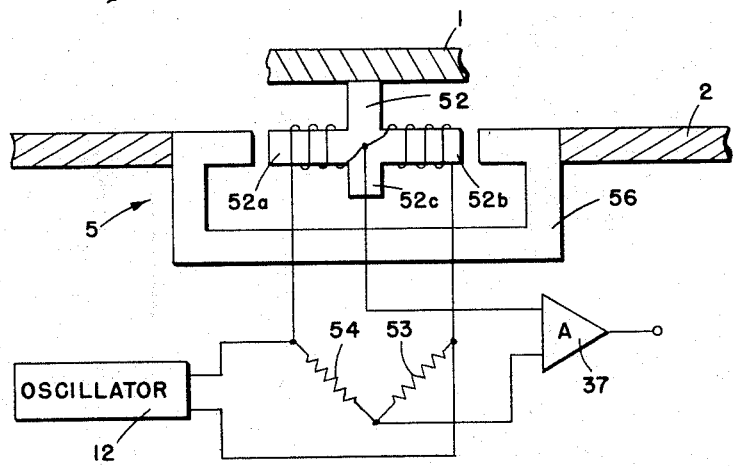
FIG. 7 is an illustration of an alternative pickoff.

FIG. 7 illustrates an alternate type pickoff for detecting deflection of pendulous element 2 from case 1. Armature 52 having ferromagnetic arms 52a and 52b and 52c is connected in a bridge circuit with resistors 53 and 54 to oscillator 12. According to the deflection, ferromagnetic C-core 56 provides a good magnetic path for one arm 52a or 52b to a return path in arm 52c. The reluctance of the arms of the bridge are thus changed according to deflection of the pendulous element 2 with respect to case 1. The output signal is sent to amplifier 37 for utilization as illustrated in the circuit of FIG. 6.

While the vehicle carrying the distance meter on a horizontally stabilized platform is at rest, the pendulous mass is undeflected and the rotor is at rest. At takeoff, accelerations are experienced, the pendulous mass deflects and the rotor commences rotation so as to return the pendulous mass to an undeflected position. If the velocity of the aircraft remains constant, the rotor continues to turn at the same rate of speed indicating constant velocity. Low-coercion support for journals 19 and 20 of pendulous element 2 are required in order for the rotor speed to be an accurate indication of actual vehicle velocity. For most advantageous operation, pendulous element 2 is to be isolated as much as possible from external torques by enclosing it and shielding it. The rotor stops when the vehicle comes to rest, the total revolutions accumulated indicating the distance traveled in the direction of the sensing axis. The device is entirely inertial, relying solely on accelerations experienced and on no outside information.

It is readily understandable that pendulous element 2 if not eccentrically mounted about axis 10 would be insensitive to accelerations. That is, if there were no unbalancing mass 3. If, for example, another remote device is utilized to sense accelerations, providing electrical currents indicative thereof, the device of the invention may likewise integrate those signals. Such electrical signals representing accelerations to be integrated, would be introduced to torquer 4 (FIGS. 1 and 3) causing deflection of the pendulous element 2. By the servo loop, the rotor acceleration would be automatically controlled, as described herein, to counteract the torque caused by torquer 4 and prevent any deflection of element 2. In such operation, the device constitutes a current-integrating device.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A motor comprising a stator pivotally mounted about an axis, a rotor rotatable within said stator about said axis, and electromagnetic windings disposed to cause rotation of said rotor whereby a reaction torque is developed on said stator, means for applying a torque to said stator, pickoff means disposed to detect pivotal deflection of said stator, servo means connected to excite said windings in synchronism with the position of said rotor for controlling the speed and direction of rotation of said rotor in response to the output of said pickoff.

2. A motor comprising a stator pivotally mounted about an axis, a rotor rotatable within said stator about said axis, electromagnetic windings disposed to cause rotation of said rotor whereby a reaction torque is developed on said stator, means for applying a torque to said stator, pickoff means disposed to detect pivotal deflection of said stator, means for providing signals in response to the angular position of said rotor and the deflection of said stator for controlling the speed and direction of rotation of said rotor.

3. The combination recited in claim 2 wherein said means for applying a torque to said stator comprises means unbalancing the mass of said stator about its pivotal axis and mobile means mounting said motor.

4. A motor comprising a stator pivotally mounted about an axis, a rotor rotatable within said stator about said axis, electromagnetic windings disposed to cause rotation of said rotor whereby a reaction torque is developed on said stator, means for applying a torque to said stator, pickoff means disposed to detect pivotal deflection of said stator, angle indicating means rotated by said rotor, servo means connected to excite said windings by providing an error signal of amplitude in accordance with said pickoff means and of phase in accordance with said angle indicating means.

5. The combination recited in claim 4 wherein said angle indicating means is phased with respect to the position of said rotor so as to provide a maximum torque.

6. An integrating motor comprising a stator pivotally mounted about an axis, a rotor rotatable within said stator about said axis, and electromagnetic windings disposed to cause rotation of said rotor whereby a reaction torque is developed on said stator, means for applying a torque to said stator, pickoff means disposed to detect pivotal deflection of said stator, angle indicating means rotated by said rotor, means for modulating the output of said angle indicating means in accordance with the output of said pickoff, the modulated output of said angle indicating means connected to excite said electromagnetic windings and phase with respect to the position of said rotor so as to cause maximum torque at all speeds of said rotor.

7. An accelerometer comprising a stator pivotally mounted about an axis, the center of gravity of said stator being offset from said axis, a rotor rotatable within said stator about said axis, and electromagnetic windings disposed to cause rotation of said rotor whereby a reaction torque is developed on said stator, pickoff means disposed to detect pivotal deflection of said stator, servo means connected to excite said windings in synchronism with the position of said rotor, said servo means controlling the speed and direction of rotation of said rotor in response to the output of said pickoff.

8. The combination recited in claim 7 wherein is included electromagnetic means for torquing said stator.

9. The combination recited in claim 7 wherein said stator containing said rotor is sealed and immersed in a fluid of low viscosity.

10. The combination recited in claim 7 wherein said stator is sealed and contains said rotor, said stator being immersed in a fluid of low viscosity and regulated pressure.

11. A measuring device comprising a first mass pivoted about an axis offset from its center of gravity, a second mass rotatably disposed on the axis of said pivoted mass and symmetrical about said axis, torque motive means for applying torque between said two masses about their common axis, servo means including a position pickoff responsive to the pivotal deflection of said first mass with respect to its environment and including generating means rotated by said second mass with respect to the first mass providing a signal of given phase with respect to the position of said second mass with respect to said first mass, said servo means energizing said torque motive means so as to maintain said first mass substantially undeflected with respect to its environment.

12. A motor comprising a stator isolated from external physical and magnetic restraints and pivotally mounted about an axis by a low-coercion bearing, a rotor rotatable within said stator about said axis, electromagnetic windings disposed to cause rotation of said rotor whereby a reaction torque is developed on said stator, means for applying a torque to said stator, pickoff means disposed to detect pivotal deflection of said stator and angular position of said rotor, servo means connected to excite said windings in accordance with said pickoff means.

13. A motor comprising a stator shielded from external magnetic and electrostatic forces, said stator pivotally mounted about an axis so as to have a minimum of pivotal restraint, a rotor rotatable within said stator about said axis, electromagnetic windings disposed to cause rotation of said rotor whereby a reaction torque is developed on said stator, means for applying a torque to said stator, pickoff means disposed to detect pivotal deflection of said stator and angular position of said rotor, servo means connected to excite said windings in accordance with said pickoff means.

14. The combination recited in claim 13 wherein said rotor is sealed within said stator and said stator is floated in a fluid having the same density as the virtual density of said stator.

References Cited in the file of this patent

UNITED STATES PATENTS

| | | |
|---|---|---|
| 2,116,221 | Sivertsen | May 3, 1938 |
| 2,672,334 | Chenery | Mar. 16, 1954 |
| 2,700,127 | Sawyer | Jan. 18, 1955 |
| 2,801,097 | Adamson | July 30, 1957 |
| 2,861,789 | Pope | Nov. 25, 1958 |

FOREIGN PATENTS

| | | |
|---|---|---|
| 713,550 | Great Britain | Aug. 11, 1954 |